United States Patent
Chen

(10) Patent No.: US 7,995,295 B2
(45) Date of Patent: Aug. 9, 2011

(54) LENS MODULE FIXING DEVICE

(75) Inventor: Hsiang-Hung Chen, Taipei Hsien (TW)

(73) Assignee: Hon Hai Precision Industry Co., Ltd., Tu-Cheng, New Taipei (TW)

( * ) Notice: Subject to any disclaimer, the term of this patent is extended or adjusted under 35 U.S.C. 154(b) by 24 days.

(21) Appl. No.: 12/629,203

(22) Filed: Dec. 2, 2009

(65) Prior Publication Data

US 2010/0238550 A1    Sep. 23, 2010

(30) Foreign Application Priority Data

Mar. 17, 2009   (CN) .......................... 2009 1 0300902

(51) Int. Cl.
  *G02B 7/02* (2006.01)
(52) U.S. Cl. ........................................ 359/811; 359/819
(58) Field of Classification Search .......... 359/694–701, 359/811–824
  See application file for complete search history.

(56) References Cited

U.S. PATENT DOCUMENTS

| | | | | |
|---|---|---|---|---|
| 4,494,667 A * | 1/1985 | Griffith | ......................... | 220/486 |
| 5,824,276 A * | 10/1998 | Janssen et al. | ................. | 422/292 |
| 7,551,357 B2 * | 6/2009 | Huang | ........................... | 359/619 |
| 7,586,696 B2 * | 9/2009 | Wu | ............................... | 359/819 |
| 7,813,062 B2 * | 10/2010 | Lin | ............................... | 359/811 |

* cited by examiner

*Primary Examiner* — Mohammed Hasan
(74) *Attorney, Agent, or Firm* — Clifford O. Chi

(57) ABSTRACT

A lens module fixing device for fixing lens module is disclosed. The lens module fixing device includes a fixing tray, a transparent and an air pumping device. The fixing tray includes a comprising a first surface and a second surface opposite to the first surface. The fixing tray defines a plurality of first through holes passing through the first surface and the second surface. The diameter of the end of the first through hole at the first surface is less than that of the end of each first through hole at the second surface. The covering is covered on the second surface of the fixing tray and defining an inner space together with the fixing tray. The air pumping device is connected to one of the fixing tray and the cover and in communication with the inner space for evacuating air from the inner space.

11 Claims, 7 Drawing Sheets

LENS MODULE FIXING DEVICE

BACKGROUND

1. Technical Field

The present disclosure relates to fixing technology, particularly, to a lens module fixing device.

2. Description of Related Art

In a lens module testing field, lens modules are fixed between a testing board and an image sensor by a fixing tray. The fixing tray defines a number of through holes for receiving the lens modules therein. However, a current lens module often includes a plastic lens barrel and/or plastic lenses. Therefore, the lens module might be propelled onto the image sensor because of electrostatic force. If the lens module hits the image sensor under electrostatic force, the image sensor might be damaged. Furthermore, the accuracy of the testing result might be greatly influenced.

What is needed, therefore, is a lens module fixing device for fixing lens modules to overcome the above-mentioned problems.

BRIEF DESCRIPTION OF THE DRAWINGS

The components of the drawings are not necessarily drawn to scale, the emphasis instead being placed upon clearly illustrating the principles of the embodiments of the lens module fixing device. Moreover, in the drawings, like reference numerals designate corresponding parts throughout several views.

DETAILED DESCRIPTION

Figure 1:
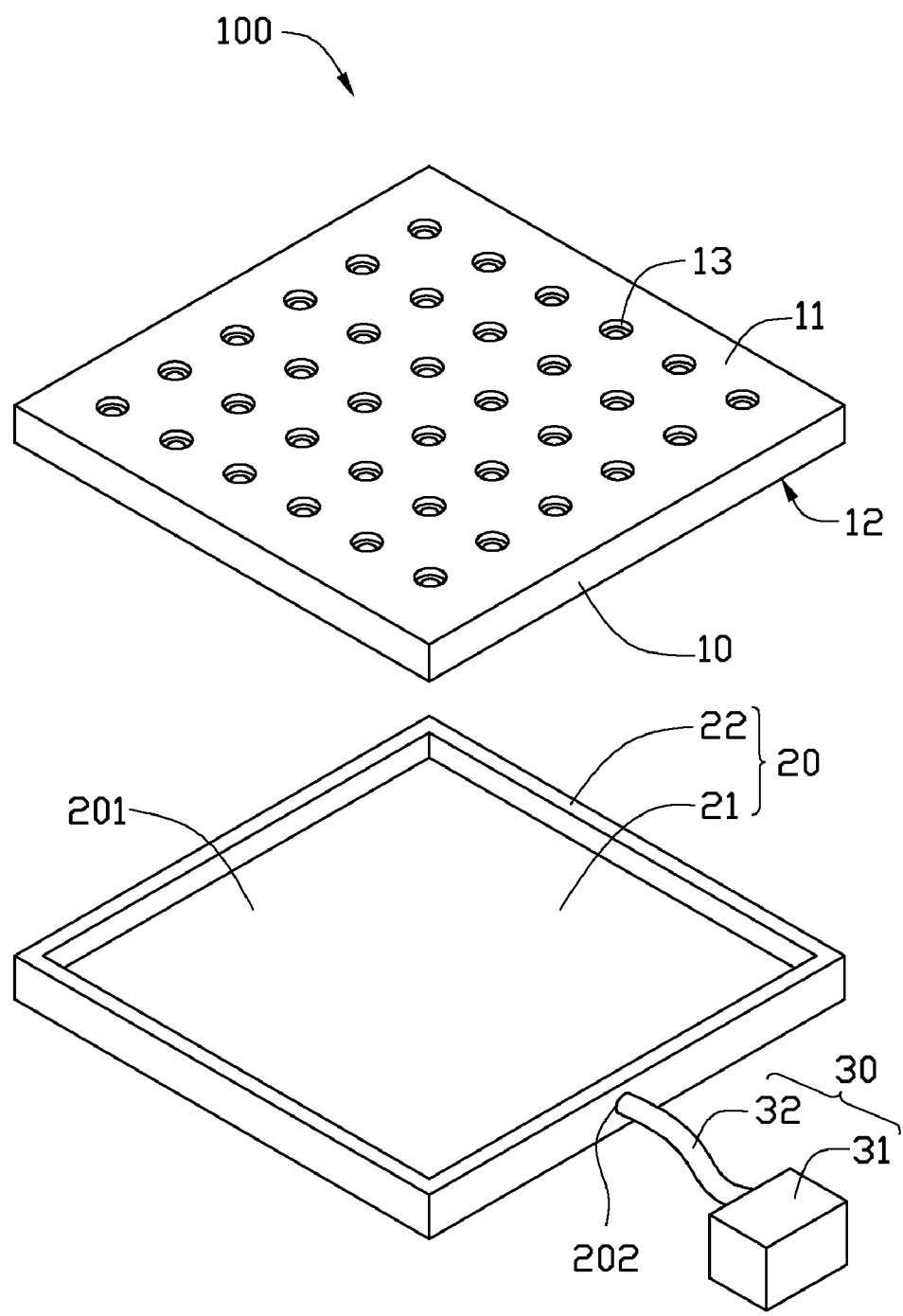
FIG. 1 is a disassembled view of a lens module fixing device, according to a first exemplary embodiment of the present disclosure.

Referring to FIG. 1, a lens module fixing device 100, according to a first exemplary embodiment, is shown. The lens module fixing device 100 includes a fixing tray 10, a cover 20, and an air pumping device 30.

The fixing tray 10 is configured for fixing lens modules (not shown) thereon. The fixing tray 10 is shaped as a flat plate and includes a first surface 11 and a second surface 12 opposite to the first surface 11. The fixing tray 10 defines a number of first through holes 13 passing through the first surface 11 and the second surface 12. The diameter of the end of each first through hole 13 at the first surface 11 is less than that of the end of the first through hole 13 at the second surface 12.

The cover 20 includes a bottom plate 21 and a side plate 22 protruding from a periphery of the bottom plate 21. The bottom plate 21 and the side surface side plate 22 cooperatively define an inner space 201. The bottom plate 21 is made from transparent material for light to pass therethrough. The side plate 22 defines a second through hole 202 communicating with the inner space 201.

The air pumping device 30 includes a pump 31 and a hollow exhaust pipe 32. One end of the hollow exhaust pipe 32 is connected to the pump 31 and the other end of the hollow exhaust pipe 32 is connected with the side plate 22 of the cover 20. The hollow exhaust pipe 32 is configured for communicating with the inner space 201 of the cover 20.

In assembly, the cover 20 is covered on the second surface 12 of the fixing tray 10, and the side plate 22 of the cover 20 is connected to edges of the fixing tray 10 in an airtight manner When testing lens modules (not shown) using the lens module fixing device 100, the lens modules are put into the first through holes 13 from the first surface 11 of the fixing tray 10. Then the first through holes 13, the inner space 201 of the cover 20 and the air pump device 30 together form a closed space. The pump 31 is activated to pump air from the closed space. Therefore, the lens modules can be sucked into the first through holes 13 with the aid of atmospheric pressure. Then, the lens module fixing device 100 with the lens modules is placed/located between a testing board (not shown) and an image sensor (not shown), with one of the lens modules aligned with the image sensor. The first surface 11 of the fixing tray 10 faces the image sensor. The lens module fixing device 100 moves between the testing board and the image sensor to aligned different lens modules with the testing board and the image sensor. Also, the image sensor can be replaced by an image sensor array, in which case each of the lens modules is aligned with a corresponding image sensor. Therefore, collisions between the lens modules and the image sensors due to electrostatic force can be prevented, and the accuracy of the testing can be enhanced.

Figure 2:
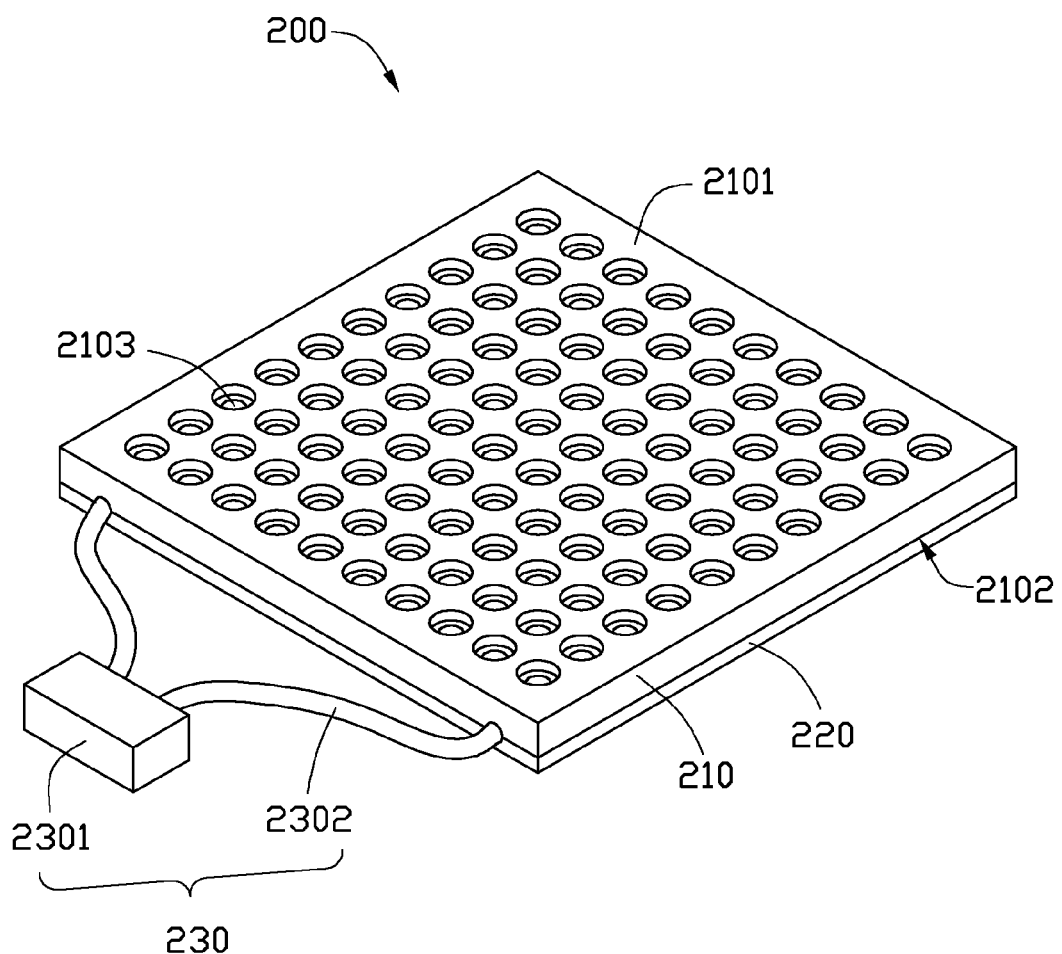
FIG. 2 is an isometric and schematic view of a lens module fixing device, according to a second exemplary embodiment of the present disclosure.
Figure 3:
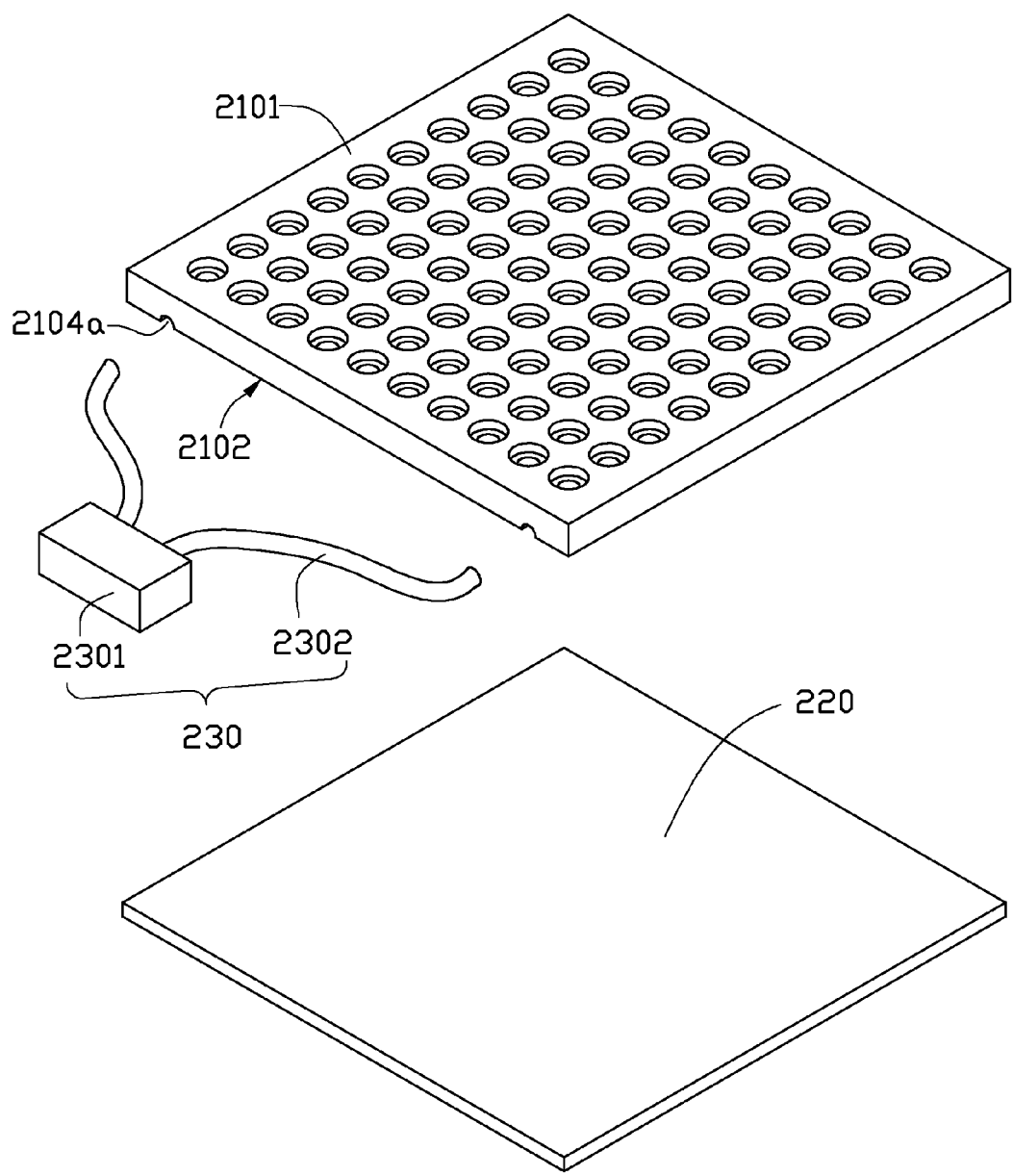
FIG. 3 is a dissembled view of the lens module fixing device of FIG. 2.
Figure 4:
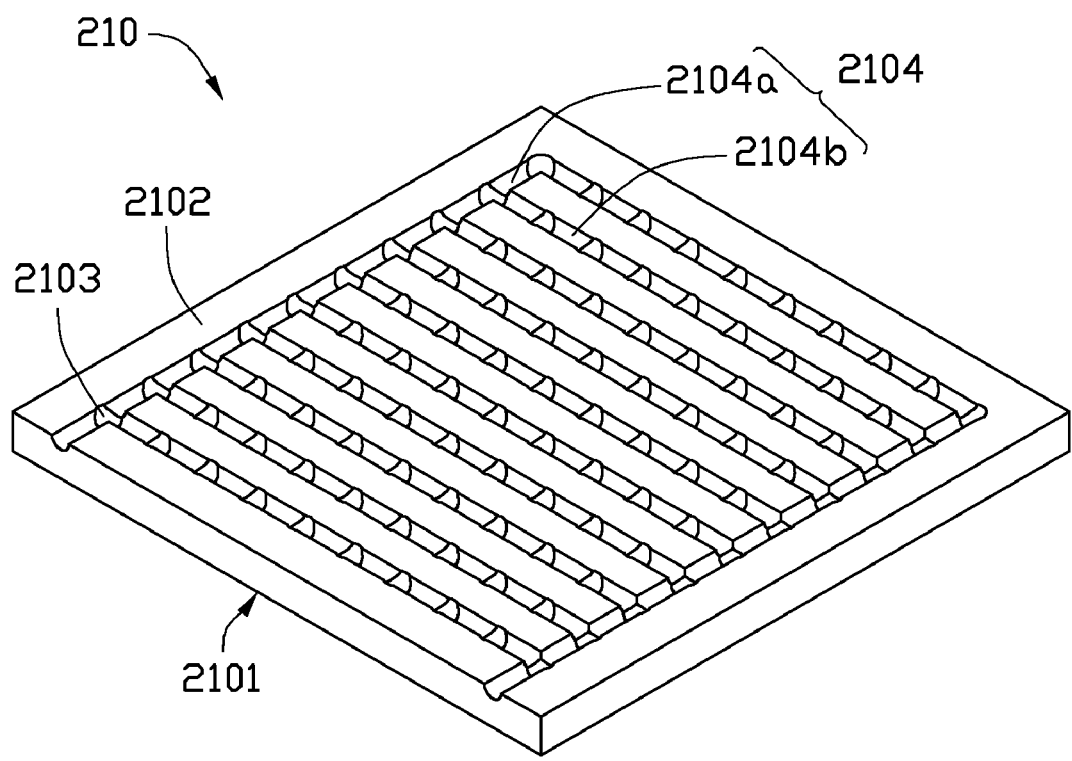
FIG. 4 is a schematic view of a fixing tray of the lens module fixing device of FIG. 3, but viewed from another aspect.

Referring to FIGS. 2-4, a lens module fixing device 200, according to a second exemplary embodiment, is shown. The lens module fixing device 200 includes a fixing tray 210, a cover 220 connected to the fixing tray 210 and an air pumping device 230 connected to the fixing tray 210.

The fixing tray 210 includes a first surface 2101 and a second surface 2102 opposite to the first surface 2101. The fixing tray 210 defines a number of first through holes 2103 passing through the first surface 2101 and the second surface 2102. The diameter of the end of each first through hole 2103 at the first surface 2101 is shorter than that of the end of the first through hole 2103 at the second surface 2102. The second surface 2102 defines a groove portion 2104 communicating with the first through holes 2103 and the air pumping device 230. In this embodiment, the groove portion 2104 is comprised of two parallel first elongated grooves 2104a and a number of parallel second elongated grooves 2104b perpendicular to the first elongated grooves 2104a. The two first elongated grooves 2104a are extend to and exposed at an edge surface of the fixing tray 210, and the two ends of each second elongated groove 2104b respectively communicate with the two first elongated grooves 2104a.

The cover 220 is shaped as a flat plate and is made from transparent material for light to pass therethrough. The air pumping device 230 includes a pump 2301 and two exhaust pipes 2302. One end of each exhaust pipe 2302 is connected to the pump 2301. The other end of each exhaust pipe 2302 is connected to a corresponding first elongated groove 2104a on the side surface of the fixing tray 210. The fixing tray 210 and the cover 220 are connected in an airtight manner.

Figure 5:
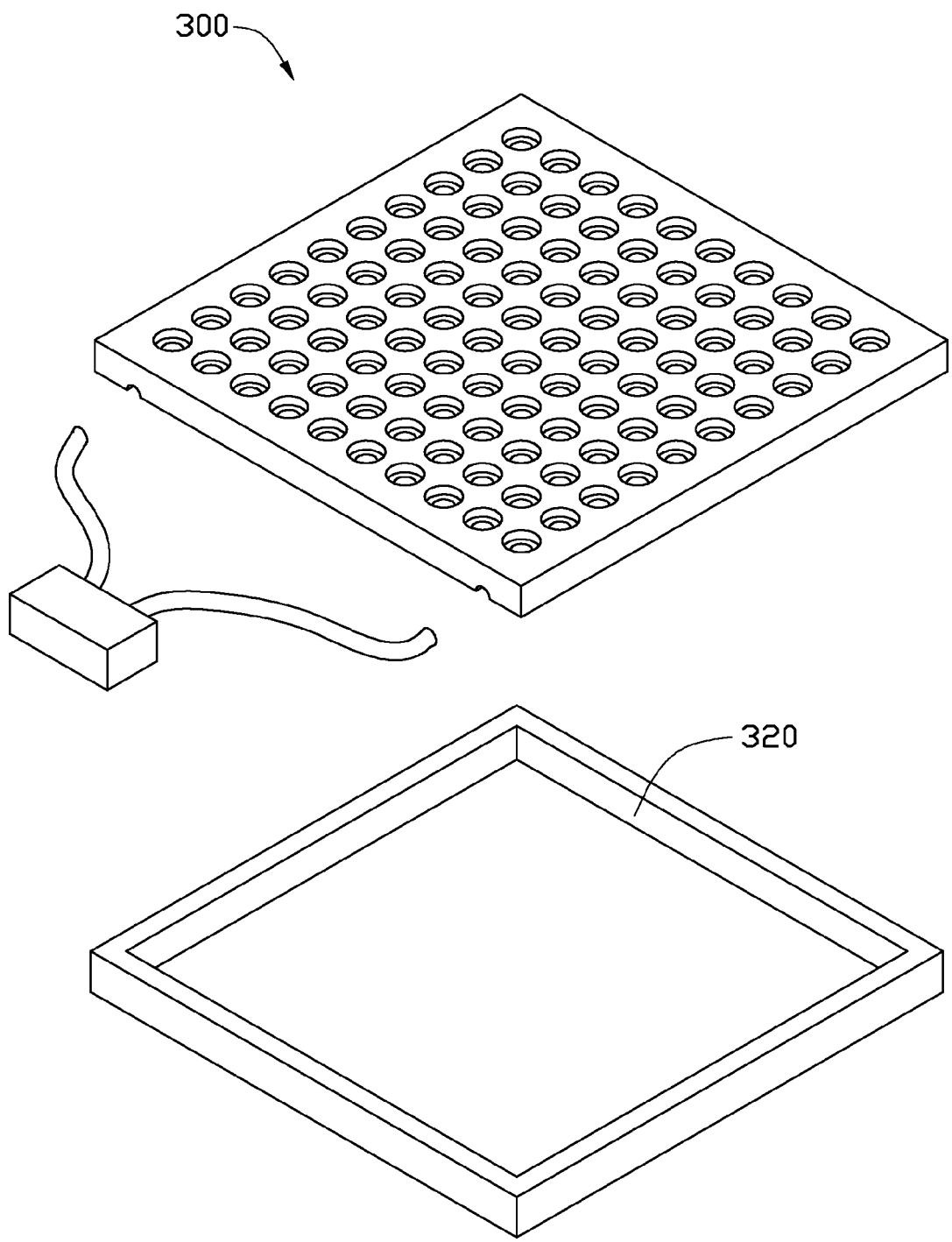
FIG. 5 is a disassembled view of a lens module fixing device, according to a third exemplary embodiment of the present disclosure.

Referring to FIG. 5, a lens module fixing device 300, according to a third exemplary embodiment, is shown. Difference between the lens module fixing device 300 of this embodiment and the lens module fixing device 200 of the second embodiment is that a cover 320 of the lens module fixing device 300 is different.

Structure of the cover 320 in this embodiment is similar to that of the cover 20 in the first embodiment, but the cover 320 does not define a second through hole in a side plate 3202 of the cover 320.

Figure 6:
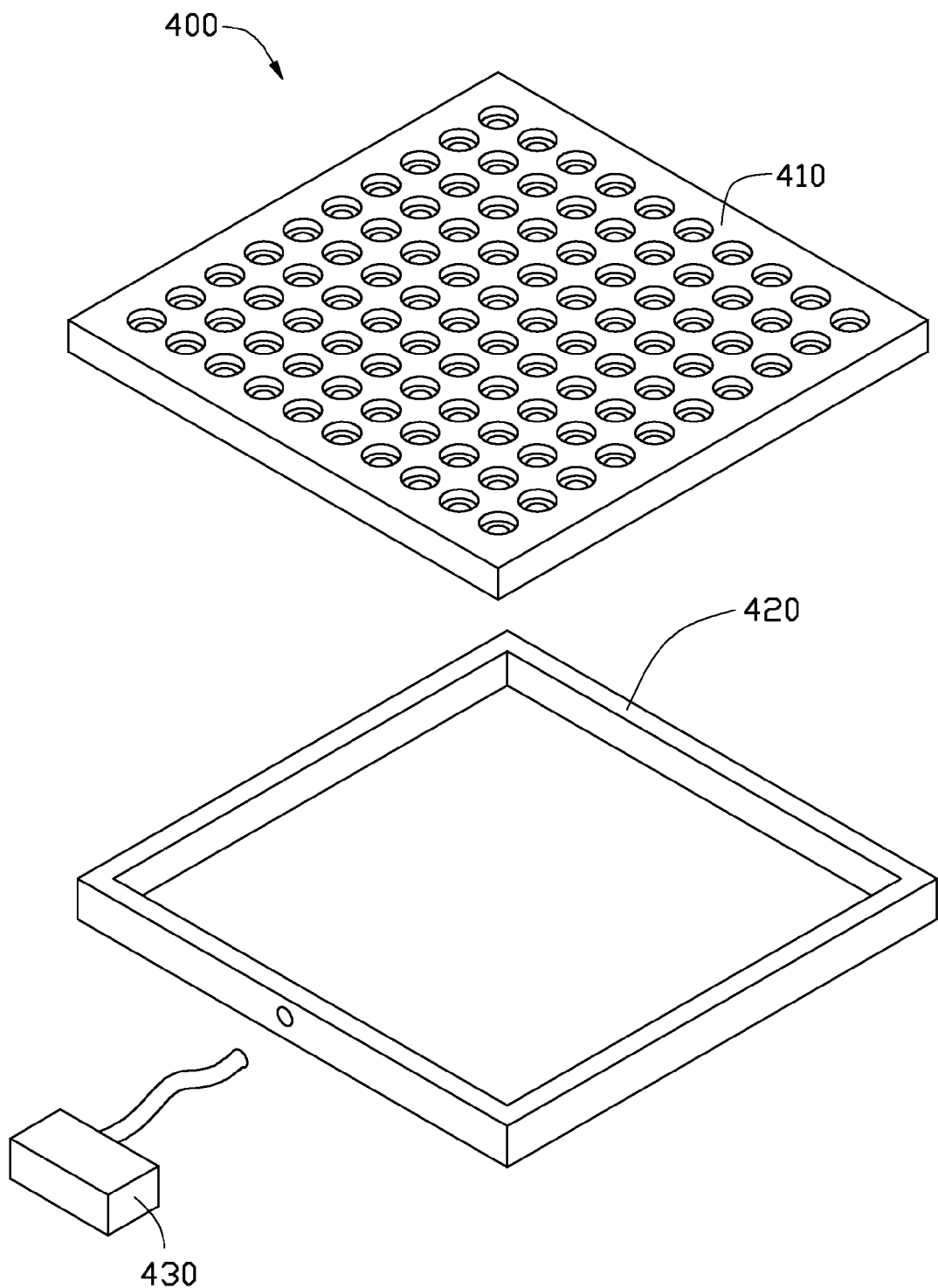
FIG. 6 is a disassembled view of a lens module fixing device, according to a fourth exemplary embodiment of the present disclosure.
Figure 7:
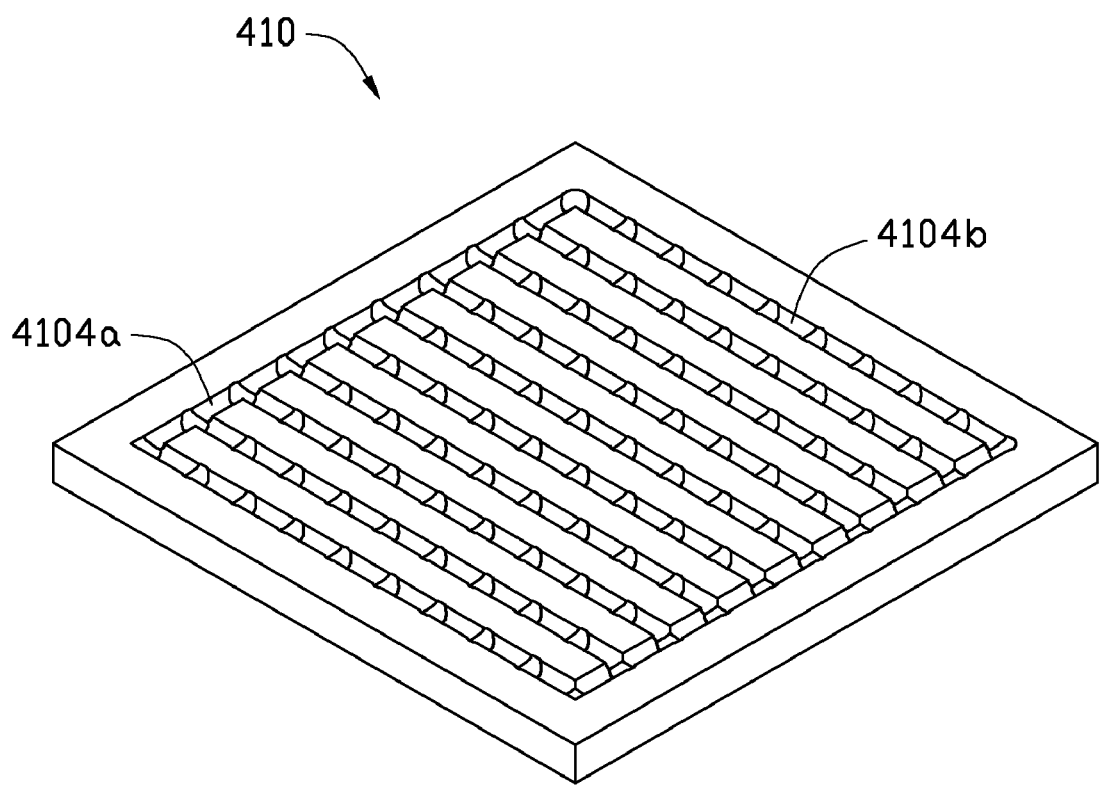
FIG. 7 is a schematic view of a fixing tray of the lens module fixing device of FIG. 6, but viewed from another aspect.

Referring to FIGS. 6-7, a lens module fixing device 400, according to a fourth exemplary embodiment, is shown. Difference between the lens module fixing device 400 of this embodiment and the lens module fixing device 100 of the first embodiment is that a fixing tray 410 is different.

Structure of the fixing tray 410 is similar as that of the fixing tray 210 of the second embodiment, except that the first elongated groove 4104a and the second elongated groove 4104b of the fixing tray 410 are defined within the area of the second surface 4102.

It is understood that a sealing material can be placed between the fixing tray and the cover to achieve an airtight coupling of the fixing tray and the cover in the above embodiments. The fixing tray is sized to fit the cover.

It is believed that the present embodiments and their advantages will be understood from the foregoing description, and it will be apparent that various changes may be made thereto without departing from the spirit and scope of the disclosure or sacrificing all of its material advantages, the examples hereinbefore described merely being preferred or exemplary embodiments of the disclosure.

What is claimed is:

1. A lens module fixing device for fixing lens modules, comprising:
    a fixing tray comprising a first surface and a second surface opposite to the first surface, the fixing tray defining a plurality of first through holes passing through the first surface and the second surface, wherein the diameter of the end of each first through hole at the first surface is less than that of the end of the first through hole at the second surface;
    a transparent cover, the second surface of the fixing tray covering the cover, the cover and the fixing tray cooperatively defining an inner space therebetween; and
    an air pumping device connected to one of the fixing tray and the cover and in communication with the inner space for evacuating air from the inner space to make the lens modules become attached to the fixing tray in the first through holes.

2. The lens module fixing device of claim 1, wherein the air pumping device comprises a pump and at least one exhaust pipe with one end connected to the pump and the other end connected to one of the fixing tray and the cover.

3. The lens module fixing device of claim 1, wherein the cover comprises a bottom plate and a side plate protruding from a periphery of the bottom plate.

4. The lens module fixing device of claim 1, wherein the fixing tray defines a groove portion in the second surface communicating with the plurality of first through holes and the air pumping device.

5. The lens module fixing device of claim 4, wherein the groove portion is comprised of two parallel first elongated grooves and a number of parallel second elongated grooves perpendicular to the two first elongated grooves, and the two ends of each second elongated groove respectively communicate with the two first elongated grooves.

6. The lens module fixing device of claim 5, wherein the two first elongated grooves extend to and are exposed at an edge of the fixing tray.

7. The lens module fixing device of claim 6, wherein the cover comprises a bottom plate and a side plate protruding from the surface of the bottom plate.

8. The lens module fixing device of claim 7, wherein the air pumping device comprises a pump and two exhaust pipes each having one end connected to the pump and the other end fixed on a side surface of the fixing tray and communicating with the two first elongated grooves.

9. The lens module fixing device of claim 5, wherein the second surface is a flat surface and the first elongated grooves and the second elongated grooves of the fixing tray are defined within the area of the second surface.

10. The lens module fixing device of claim 9, wherein the cover comprises a bottom plate and a side plate protruding from the surface of the bottom plate, the bottom plate and the side plate cooperatively define an inner space, the side plate defines at least one second through hole communicating with the inner surface.

11. The lens module fixing device of claim 10, wherein the air pumping device comprises a pump and at least one exhaust pipe coupled to the at least one second through hole, one end of each exhaust pipe is connected to the pump, and the other end of each exhaust pipe is fixed in the corresponding second through hole of the cover.

* * * * *